United States Patent
Bohmbach et al.

(10) Patent No.: US 11,422,574 B2
(45) Date of Patent: Aug. 23, 2022

(54) FLIGHT MANAGEMENT COMPUTER FUEL SAVINGS THROUGH TRAJECTORY OPTIMIZATION

(71) Applicant: GE Aviation Systems LLC, Grand Rapids, MI (US)

(72) Inventors: Christi Lynn Bohmbach, Portland, OR (US); Scott Robert Edwards, Grandville, MI (US)

(73) Assignee: GE Aviation Systems LLC, Grand Rapids, MI (US)

(*) Notice: Subject to any disclaimer, the term of this patent is extended or adjusted under 35 U.S.C. 154(b) by 0 days.

(21) Appl. No.: 16/936,525

(22) Filed: Jul. 23, 2020

(65) Prior Publication Data

US 2022/0026927 A1   Jan. 27, 2022

(51) Int. Cl.
| | | |
|---|---|---|
| *G05D 1/10* | (2006.01) | |
| *B64D 43/00* | (2006.01) | |
| *G01C 23/00* | (2006.01) | |
| *G06F 3/14* | (2006.01) | |
| *G08G 5/00* | (2006.01) | |

(52) U.S. Cl.
CPC .............. *G05D 1/106* (2019.05); *B64D 43/00* (2013.01); *G01C 23/005* (2013.01); *G06F 3/14* (2013.01); *G08G 5/0039* (2013.01)

(58) Field of Classification Search
CPC ......... G06F 3/14; B64D 43/00; G01C 23/005; G08G 5/0039; G05D 1/106
USPC ....................................................... 701/300
See application file for complete search history.

(56) References Cited

U.S. PATENT DOCUMENTS

| | | | | |
|---|---|---|---|---|
| 5,646,854 A | * | 7/1997 | Bevan ................... | G05D 1/0202 |
| | | | | 701/120 |
| 6,334,344 B1 | | 1/2002 | Bonhoure et al. | |
| 9,171,473 B1 | * | 10/2015 | McNally ............... | G08G 5/0095 |
| 9,423,799 B1 | * | 8/2016 | Wu ........................ | G08G 5/0021 |
| 9,536,435 B1 | * | 1/2017 | Shay ...................... | G05D 1/0005 |
| 9,728,091 B2 | * | 8/2017 | Shay ...................... | G01C 21/20 |
| 9,870,712 B1 | * | 1/2018 | Weichbrod ........... | G08G 5/0021 |
| 9,965,961 B2 | | 5/2018 | Agrawal | |
| 10,170,007 B2 | | 1/2019 | Borgyos | |
| 2019/0045348 A1 | * | 2/2019 | Li ........................... | H04W 16/28 |
| 2019/0096268 A1 | | 3/2019 | Kusuma et al. | |
| 2019/0311631 A1 | | 10/2019 | Holmes | |
| 2019/0317489 A1 | | 10/2019 | Hansman et al. | |
| 2020/0005654 A1 | | 1/2020 | Mere et al. | |
| 2020/0200540 A1 | | 6/2020 | Rossi et al. | |
| 2021/0088356 A1 | * | 3/2021 | Glomski ................ | G01C 23/00 |

FOREIGN PATENT DOCUMENTS

| | | | | |
|---|---|---|---|---|
| EP | 0396070 A2 | 11/1990 | | |
| WO | WO-2020187880 A1 | * | 9/2020 | ............. G01C 21/20 |

* cited by examiner

*Primary Examiner* — Jonathan M Dager
*Assistant Examiner* — Jean W Charleston
(74) *Attorney, Agent, or Firm* — McGarry Bair PC

(57) ABSTRACT

The disclosure generally relates to systems and method within computer systems for an aircraft particularly focused on lateral path generation opportunities for fuel savings beyond that of renditions calculated by a flight management system. The approach focuses on turn generation that reduces fuel consumption and environmental impacts of excess $CO_2$ emissions.

20 Claims, 6 Drawing Sheets

FLIGHT MANAGEMENT COMPUTER FUEL SAVINGS THROUGH TRAJECTORY OPTIMIZATION

TECHNICAL FIELD

The present subject matter relates generally to computer systems for an aircraft particularly focused on lateral path generation opportunities for fuel savings.

BACKGROUND

Air traffic management systems are currently reaching their limits of capacity because there is an increasing demand for operating commercial aircrafts. The increasing demand for operating commercial aircrafts also increases the environmental impact of aviation. Therefore, there is a need to increase aircraft flights and decrease the environmental impact of the increased aircraft flights.

BRIEF DESCRIPTION

One example aspect of the present disclosure relates to a method of providing fuel saving through trajectory optimization of an aircraft, comprising, receiving, at a controller module, a first lateral flight path defined by a first straight segment, a curved segment, and a second straight segment associated with flying from a first location to a second location, identifying, at the controller module, a first length of the first lateral flight path, generating, by the controller module, a second lateral flight path associated with flying from the first location to the second location wherein the second lateral flight path is along at least a portion of the first straight segment and a portion of the second straight segment and the second lateral flight path has a length less than the length of the first lateral flight path, generating, by the controller module, a set of instructions indicative of the second flight path, outputting the set of instructions operable to operate the aircraft, by the controller module, from a flight management system.

Another example aspect of the present disclosure relates to a flight management system comprising, a display electrically coupled to the flight management system; and a controller module configured to: compute a first lateral flight path defined by a first straight segment, a curved segment, and a second straight segment associated with flying from a first location to a second location, identify a length of the first lateral flight path, generate a second lateral flight path associated with the first location and the second location wherein the second lateral flight path is along at least a portion of the first straight segment and a portion of the second straight segment and the second lateral flight path has a length less than the length of the first lateral flight path, and generate a set of instructions indicative of the second flight path; and output the set of instructions to the display.

Another example aspect of the present disclosure relates to a method of trajectory optimization of an aircraft, comprises, identifying, by one or more computing devices, a first flight path associated with a first location and a second location, identifying, by one or more computing devices, a first flight path length, generating, by one or more computing devices, a second flight path associated with the first location and the second location, wherein the second flight path has a second flight path length less than the first flight path length, generating a set of instructions, by one or more computing devices, to output the second flight path, and outputting the set of instructions, by one or more computing devices, from a flight management system.

These and other features, aspects and advantages of the present disclosure will become better understood with reference to the following description and appended claims. The accompanying drawings, which are incorporated in and constitute a part of this specification, illustrate aspects of the disclosure and, together with the description, serve to explain the principles of the disclosure.

BRIEF DESCRIPTION OF THE DRAWINGS

A full and enabling disclosure of the present description, including the best mode thereof, directed to one of ordinary skill in the art, is set forth in the specification, which makes reference to the appended FIGS., in which.

DETAILED DESCRIPTION

Figure 1:
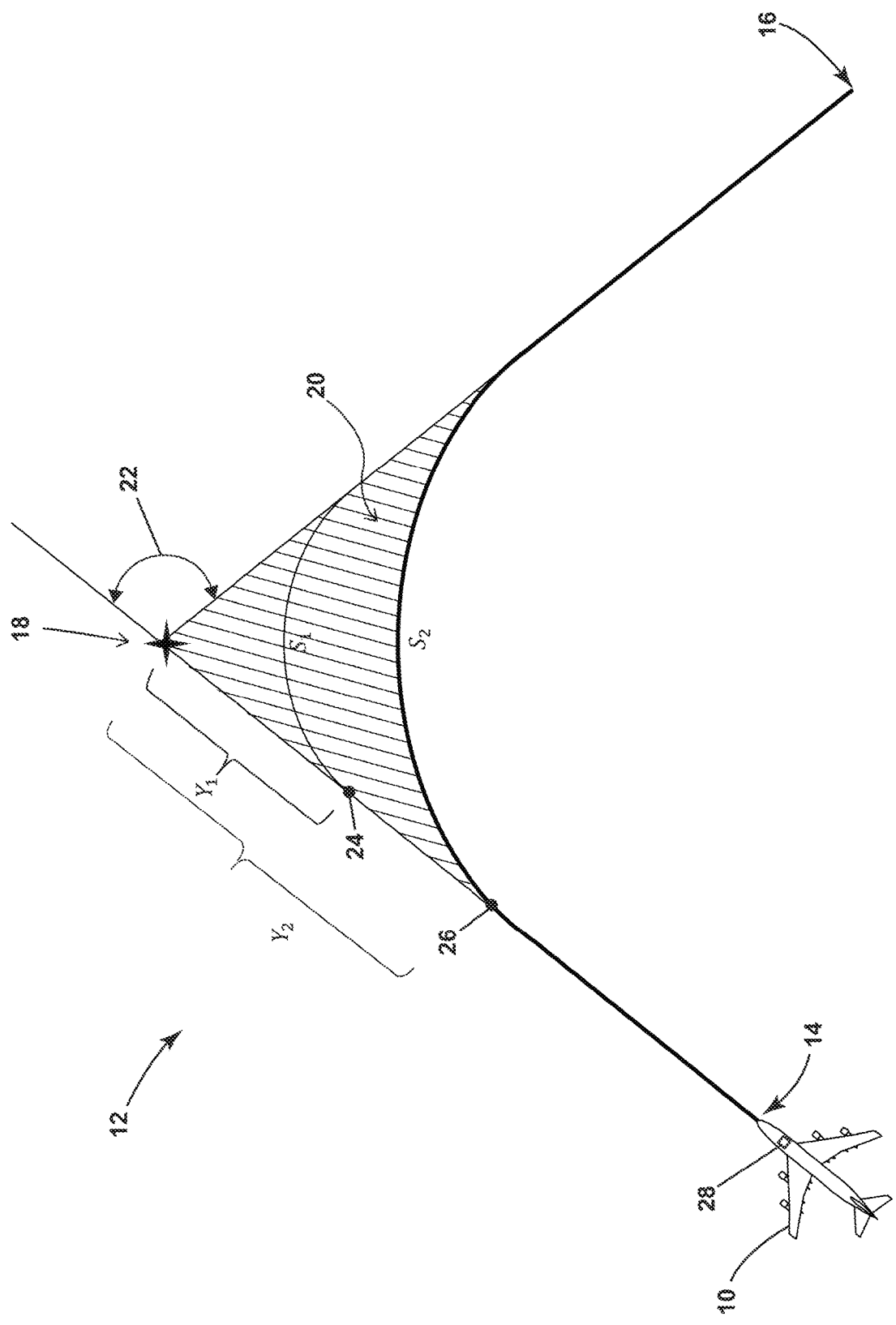
FIG. 1 illustrates a diagram of a comparison between two lateral flight paths within an exemplary transitional turn of an aircraft.

Example aspects of the present disclosure are directed to computer systems for an aircraft, particularly focused on lateral path generation opportunities for fuel savings The disclosure describes resolving the need to increase aircraft flights while simultaneously decreasing the environmental impact of those increased aircraft flights through flight path optimization. Flight path optimization achieves fuel savings by shortening the length of a lateral path generated by a flight management system (FMS).

Also as used herein, while sensors can be described as "sensing" or "measuring" a respective value, sensing or measuring can include determining a value indicative of or related to the respective value, rather than directly sensing or measuring the value itself. The sensed or measured values can further be provided to additional components. For instance, the value can be provided to a controller module or processor, and the controller module or processor can perform processing on the value to determine a representative value or an electrical characteristic representative of said value.

All directional references (e.g., radial, axial, upper, lower, upward, downward, left, right, lateral, front, back, top, bottom, above, below, vertical, horizontal, clockwise, counterclockwise) are only used for identification purposes to aid the reader's understanding of the disclosure, and do not create limitations, particularly as to the position, orientation, or use thereof. Connection references (e.g., attached, coupled, connected, and joined) are to be construed broadly and can include intermediate members between a collection of elements and relative movement between elements unless otherwise indicated. As such, connection references do not necessarily infer that two elements are directly connected and in fixed relation to each other. In non-limiting examples, connections or disconnections can be selectively configured to provide, enable, disable, or the like, an electrical connection between respective elements. Non-limiting example power distribution bus connections or disconnections can be enabled or operated by way of switching, bus tie logic, or any other connectors configured to enable or disable the energizing of electrical loads downstream of the bus. Additionally, as used herein, "electrical connection" or "electrically coupled" can include a wired or wireless connection. The exemplary drawings are for purposes of illustration only and the dimensions, positions, order and relative sizes reflected in the drawings attached hereto can vary.

Additionally, as used herein, a "controller" or "controller module" can include a component configured or adapted to provide instruction, control, operation, or any form of communication for operable components to effect the operation thereof. A controller module can include any known processor, microcontroller, or logic device, including, but not limited to: field programmable gate arrays (FPGA), an application specific integrated circuit (ASIC), a full authority digital engine control (FADEC), a proportional controller (P), a proportional integral controller (PI), a proportional derivative controller (PD), a proportional integral derivative controller (PID controller), a hardware-accelerated logic controller (e.g. for encoding, decoding, transcoding, etc.), the like, or a combination thereof. Non-limiting examples of a controller module can be configured or adapted to run, operate, or otherwise execute program code to effect operational or functional outcomes, including carrying out various methods, functionality, processing tasks, calculations, comparisons, sensing or measuring of values, or the like, to enable or achieve the technical operations or operations described herein. The operation or functional outcomes can be based on one or more inputs, stored data values, sensed or measured values, true or false indications, or the like. While "program code" is described, non-limiting examples of operable or executable instruction sets can include routines, programs, objects, components, data structures, algorithms, etc., that have the technical effect of performing particular tasks or implement particular abstract data types. In another non-limiting example, a controller module can also include a data storage component accessible by the processor, including memory, whether transient, volatile or non-transient, or non-volatile memory.

Additional non-limiting examples of the memory can include Random Access Memory (RAM), Read-Only Memory (ROM), flash memory, or one or more different types of portable electronic memory, such as discs, DVDs, CD-ROMs, flash drives, universal serial bus (USB) drives, the like, or any suitable combination of these types of memory. In one example, the program code can be stored within the memory in a machine-readable format accessible by the processor. Additionally, the memory can store various data, data types, sensed or measured data values, inputs, generated or processed data, or the like, accessible by the processor in providing instruction, control, or operation to effect a functional or operable outcome, as described herein. In another non-limiting example, a control module can include comparing a first value with a second value, and operating or controlling operations of additional components based on the satisfying of that comparison. For example, when a sensed, measured, or provided value is compared with another value, including a stored or predetermined value, the satisfaction of that comparison can result in actions, functions, or operations controllable by the controller module. As used, the term "satisfies" or "satisfaction" of the comparison is used herein to mean that the first value satisfies the second value, such as being equal to or less than the second value, or being within the value range of the second value. It will be understood that such a determination may easily be altered to be satisfied by a positive/negative comparison or a true/false comparison. Example comparisons can include comparing a sensed or measured value to a threshold value or threshold value range.

As used herein, an "essential" electrical load can be a subset of one or more electrical loads of a power distribution system or architecture classified or categorized as "essential" or "critical" to the operation of the power architecture, vehicle, or another system. In one non-limiting aspect, an "essential" electrical load can be critical to flight operations of an aircraft or critical aircraft systems, and can be defined by relevant federal aircraft regulations or relevant industry standards.

Reference now will be made in detail to aspects of the present disclosure, one or more examples of which are illustrated in the drawings. Each example is provided by way of explanation of the disclosure, not limitation of the disclosure. In fact, it will be apparent to those skilled in the art that various modifications and variations can be made in the present disclosure without departing from the scope or spirit of the disclosure. For instance, features illustrated or described as part of one aspect can be used with another aspect to yield a still further embodiment. Thus, it is intended that the present disclosure covers such modifications and variations as come within the scope of the appended claims and their equivalents.

As used herein, the term "about," when used in reference to a numerical value is intended to refer to within 30% of the numerical value. As used in the specification and the appended claims, the singular forms "a," "an," and "the" include plural referents unless the context clearly dictates otherwise.

Flight planning is the process of producing a flight plan to describe a proposed aircraft flight. Flight planning can involve at least two safety-critical aspects: fuel calculation, to ensure that the aircraft can safely reach the destination, and compliance with air traffic control requirements, to minimize the risk of midair collision. In addition, optimized flight planning can minimize flight cost through the appropriate choice of route, height, and speed, and by loading the minimum necessary fuel on board.

An aircraft flying in a controlled airspace must follow predetermined routes known as airways (at least where they have been defined under the supervision of air traffic controllers), even if such routes are not as economical as a more direct flight. Within the airways, the aircraft must maintain flight levels, specified altitudes usually separated vertically by 1,000 or 2,000 ft (300 or 610 m), depending on the route being flown and the direction of travel.

Producing an accurate optimized flight plan can require multiple calculations, so commercial flight planning systems make extensive use of computers. While some commercial airlines have their own internal flight planning system, and others employ the services of external planners, both must follow commercial operating industry standards (e.g., US FAR § 121, RTCA DO-236/DO-283, Canadian regulations, etc.). These regulations vary by country but more and more countries require their airline operators to meet these standards.

Each airway starts and finishes at a waypoint, and may contain some intermediate waypoints as well. A waypoint is a point or place on a route of a flight path, a stopping point or point at which course is changed. Waypoints can often refer to coordinates which specify an aircraft's position on the globe at the end of each "leg" (stage) of an air flight.

Airways may cross or join at a waypoint, so an aircraft can change from one airway to another at such points. A complete route between airports often uses several airways. Most waypoints are classified as compulsory reporting points; that is, the pilot (or the onboard flight management system) reports the aircraft's position to air traffic control as the aircraft passes a waypoint. Therefore, multiple transitional turns can be required within one flight path.

FIG. 1 illustrates a diagram of a comparison between two lateral flight paths $S_1$ and $S_2$ within an exemplary transitional turn of an aircraft 10 generated by a flight management system (FMS) 12. FIG. 1 illustrates the aircraft 10 transitioning from an end of leg one 14 to a leg two 16 with a calculated transition point 18 located at the end of leg one 14 and the leg two 16. In other words, the aircraft follows a first straight flight segment along leg one 14, followed by a curved flight segment to a second straight flight segment when flying from one destination to another. The term straight can include a 'flat-earth' straight segment. The term straight can also include a geodetic or great-circle straight. The transition point 18 can be a point where the ends of leg one 14 and the leg two 16 intersect. A boundary area 20 is indicated by the shaded area and can be established by industry standards or guidelines (e.g. RTCA DO-236 and RTCA DO-238). The boundary area 20 can include the industry guidelines where the turn initiation of the aircraft 10 must occur. For example, the DO-236C Section 3.2.5.4.1 has defined parameters for the boundary area of a fly-by transition as follows:

Radius of a turn $R=(GS)^2/g \; \text{Tan}(\Phi)=(GS)^2/(68625.4*\tan(\Phi))$ NM Acceleration of Gravity $(g)=68625.4$ NM/hr$^2$ Turn Initiation Boundary Distance $(Y)=R*\tan(0.5\alpha)$ Where GS=V+W is the groundspeed, in knots, assumed for the transition turn, α=track change, in degrees, and Φ=the planned aircraft bank angle, in degrees Historically, path generation algorithms have resulted in a path that lies clearly within the Boundary Area (as shown by S1). The path was generated by computing a bank angle based on a track change 22, and then computing a turn radius based on the bank angle. DO-236C defines a relationship between track change and bank angle as part of the parameter definition for the boundary area 20. The bank angle and track change are directly proportional. For example, the DO-236C defines a bank angle for low altitude (<FL195) to equal one-half the track change limited to 23 degrees. In another non-limiting example, the DO-236C defines the bank angle can be five degrees, provided that the bank angle will not result in a turn initiation boundary distance greater than 20 nm. Another non-limiting example can define the bank angle between 0.5 and 1 of the track change 22 and applied to both lower and upper limits of the boundary area 20. Thus, shortening the overall path length.

FIG. 1 illustrates the radius of the turn (R) as the arch (S1 or S2). The turn initiation boundary distance (Y) is depicted as the distance between an initiation point 24, 26 and the transition point 18.

The historical flight path $S_1$ can be optimized by shortening the flight path, which reduces fuel consumption and decreases the environmental impact of the aircraft 10, and still remain within the industry guidelines of the calculated boundary area 20. The optimized flight path can also avoid introduction of objectional/corner case scenarios (sometimes referred to as bypass, truncations, or overlapping of turn path segments.) The optimized flight path can be generated by a controller module 28 within the FMS 12. The controller module 28 can analyze the data used to configure $S_1$ and generate a new set of instructions for an optimized flight path S2 based off of $S_1$, and output those instructions to a display or autopilot controller module (not shown) within the aircraft 10. The controller module 28 can generate the set of new instructions for the optimized flight path $S_2$ by computing $S_2$ to be less than $2*(Y_2-Y_1)+S_1$. FIG. 1 also visually illustrates $S_2$ to have a shorter flight path than $S_1$ and still remain within the industry guidelines of the calculated boundary area 20. The controller module 28 can also be programed to include a buffer distance resulting in a flight path between $S_1$ and $S_2$ depending on an operator's desired parameters (e.g. for a flight path to be within a predetermined distance from the boundary area 20.)

Figure 2:
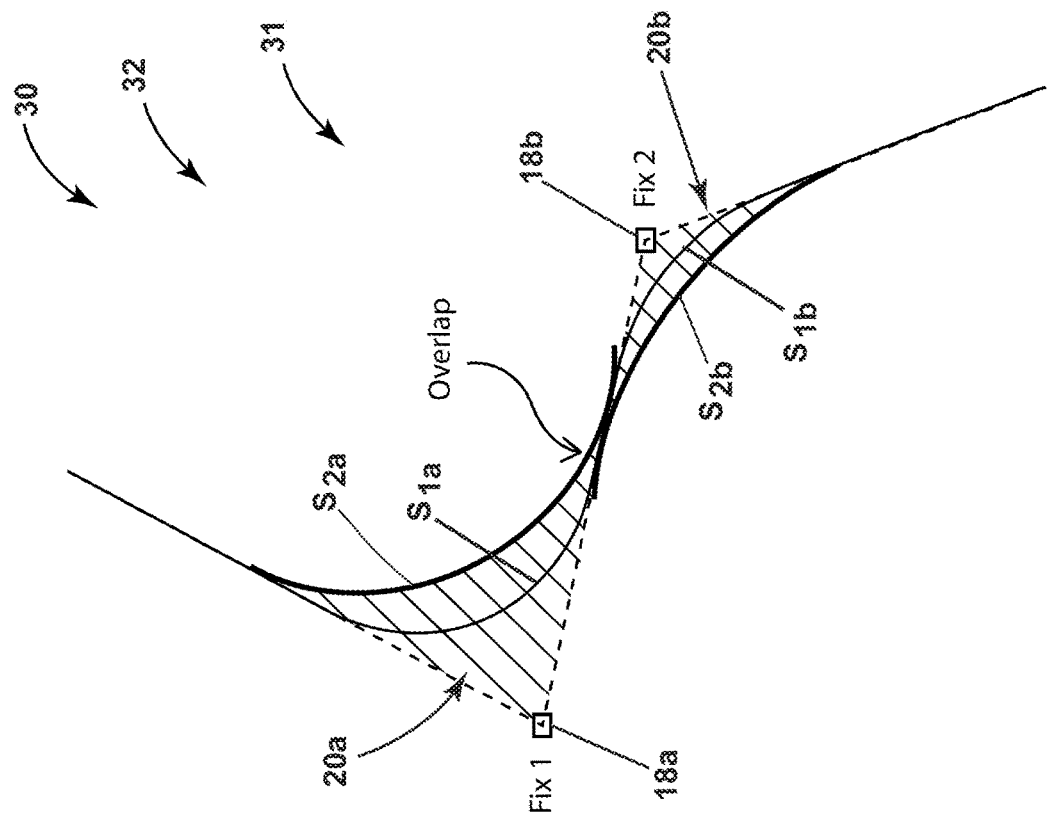
FIG. 2 illustrates a diagram of a mitigation technique of an overlap of two consecutive transition turns.

FIG. 2 illustrates a diagram of another non-limiting example of the FMS 12 generating a flight path 30 consisting of two consecutive transitional turns. The diagram shows a historical two consecutive transition turns as $S_{1a}$ and $S_{1b}$. The flight path 30 represented by $S_{1a}$ and $S_{1b}$ can be optimized to a new flight path 32 represented by $S_{2a}$ and $S_{2b}$ using a mitigation technique and still remain in the respective boundary areas 20a, 20b as described in FIG. 1. However, the optimized flight path 32 results in a non-flyable path due to an overlap. Therefore, the controller module 28 can generate a set of instructions for an optimized flyable flight path 31. The optimized flyable flight path 31 (not shown) can be located between the flight path 30 represented by $S_{1a}$ and $S_{1b}$ and the optimized flight path 32 represented by $S_{2a}$ and $S_{2b}$. The optimized flyable flight path 31 can also have greater fuel efficiency than the original flight path 30.

Figure 3:
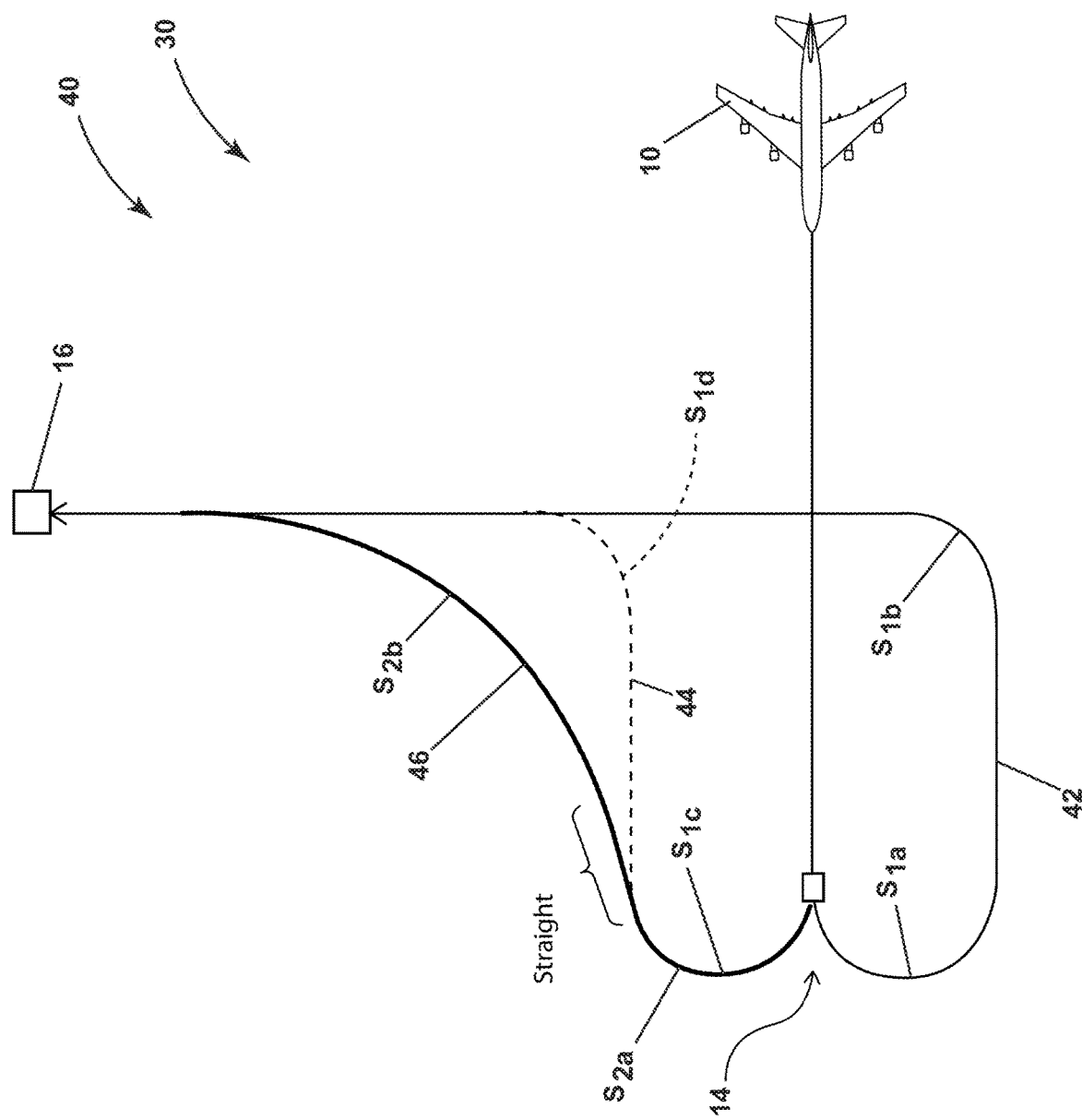
FIG. 3 illustrates a diagram of another example of aircraft transition optimization.

FIG. 3 illustrates a diagram of another non-limiting example of the FMS 12 generating a flight path 30 consisting of a curve-straight-curve transition 40. The diagram shows one possible curve-straight-curve transition of the path 42 as $S_{1a}$ and $S_{1b}$. The diagram also illustrates another possible curve-straight-curve transition of the path 44 as $S_{1c}$ and $S_{1d}$. The flight paths 42, 44 can instead be optimized to a new flight path 46 to reduce fuel consumption. The curve-straight-curve transition 40 can include a combination of curve and straight segment elements, which can minimize the length of the transition. The controller module 28 can generate the set of instructions for an optimized flight path 46 with the curve-straight-curve transition 40 as similarly described in FIG. 1. Similar to FIG. 1., the controller 28 can analyze the data used to configure $S_1$ for the flight path 42 of the first turn $S_{1a}$ and the second turn $S_{1b}$. The controller 28 can also analyze the data used to configure $S_1$ for the flight path 44 of the first turn $S_{1c}$ and the second turn $S_{1d}$. The controller 28 can also generate a set of instructions for an optimized flight path $S_2$ for the first turn $S_{2a}$ and the second tern $S_{2b}$ based off of $S_{1a}$ and $S_{1b}$ or $S_{1c}$ and $S_{1d}$. The controller 28 can also output those instructions to a display or autopilot controller module (not shown) within the aircraft 10.

Figure 4:
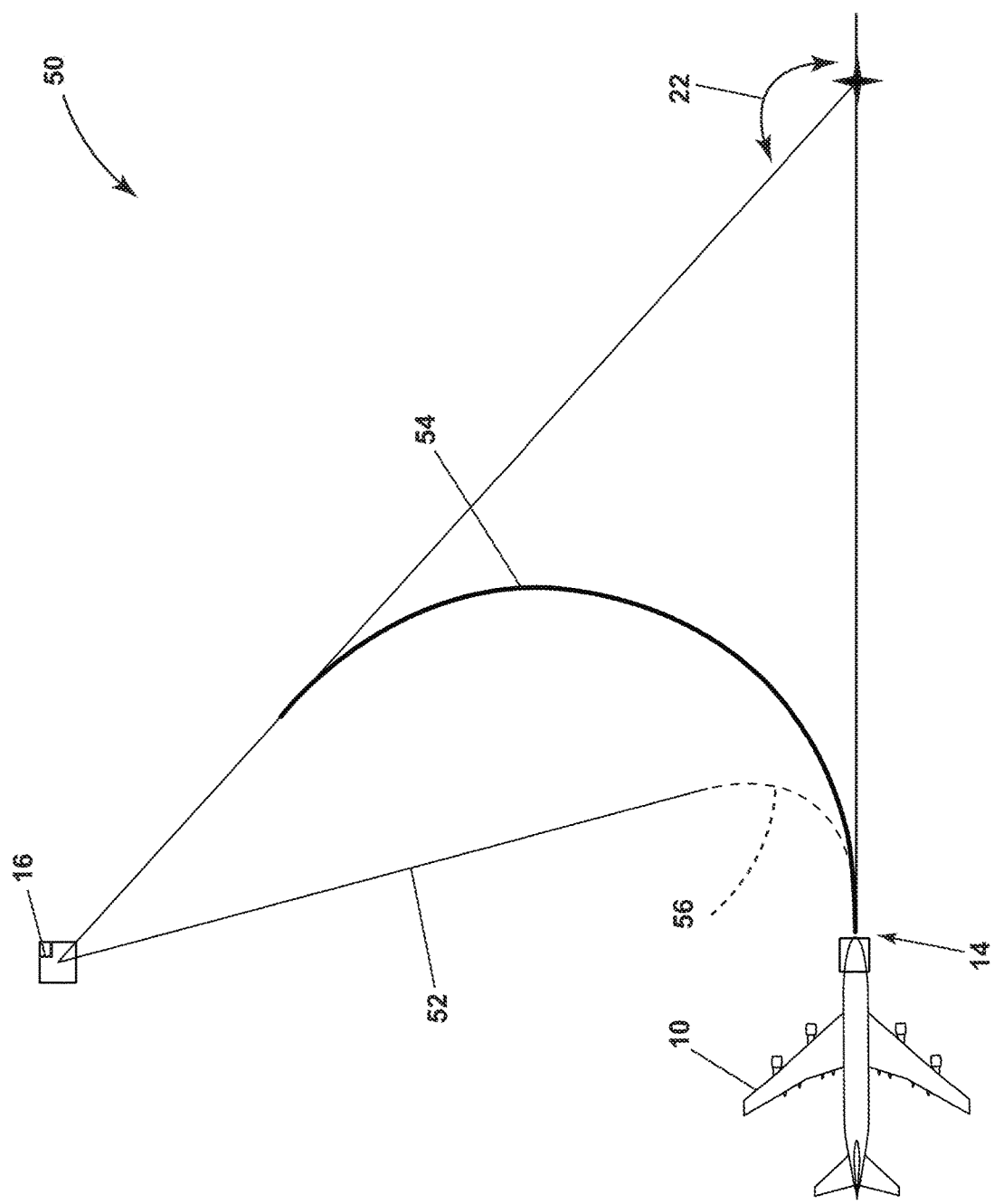
FIG. 4 illustrates a diagram of another example aircraft transition optimization.

FIG. 4 illustrates a diagram of another non-limiting example of the FMS 12 generating a flight path 52 consisting of an ARINC 424 DF leg transition 50. DF leg transition 50 is a name of one of 23 leg types defined by ARINC 424. The bolded line 54 illustrates a non-optimized DF leg. The dotted line 56 illustrates an optimized DF leg generated by the controller module 28. A higher bank angle based on track change 22 is needed to achieve the optimized path allows fuel savings.

There can be a mis-match in how the path for these leg types are built versus how they are flown. The bank angle used to generate the path can be smaller than the bank angle used to fly the path. In another non-limiting example, industry standards can have a maximum allowable bank angle with which the aircraft 10 is allowed to bank. In another non-limiting examples, industry standards can have a minimum limit of the bank angle for path generation. For example, in flight, the autopilot may not allow a bank angle over 30 degrees.

The controller module 28 can generate instructions to increase the bank angle used to generate the new flight path 52. Increasing the bank angle can reduce the radius of the curve because the bank angle and the radius are inversely proportional. The controller module 28 can also shorten the overall length of the path and reduce fuel consumption.

Figure 5:
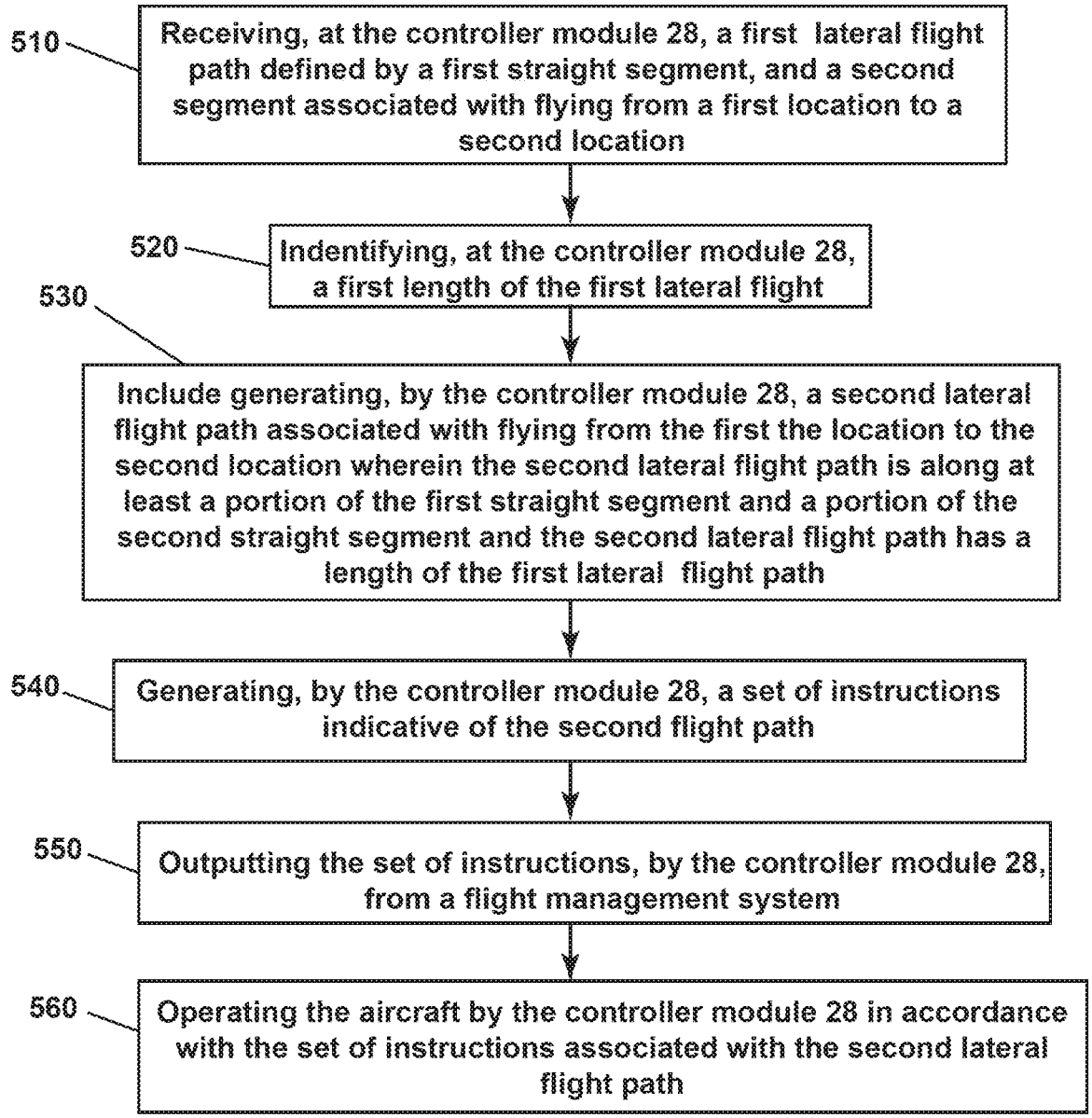
FIG. 5 illustrates a flow diagram of an example method in accordance with various aspects described herein.

FIG. 5 depicts a flow diagram of an example method 500 according to example aspects of the present disclosure. FIG. 5 depicts steps performed in a particular order for purposes of illustration and discussion. Those of ordinary skill in the art, using the disclosure provided herein, will understand that the method discussed herein can be adapted, rearranged, expanded, omitted, performed simultaneously, or modified in various ways without deviating from the scope of the present disclosure. Method 500 can be performed using the control system 600.

At 510, the method 500, can include receiving, at the controller module 28, a first lateral flight path defined by a first straight segment, a curved segment, and a second straight segment associated with flying from a first location to a second location. In some aspects, the first straight segment and the second straight segment intersect at a transition fix point, which can define a turn initiation boundary distance. In another non-limiting example, the turn initiation boundary distance of the second lateral flight path can be greater than the turn initiation boundary distance of the first lateral flight path. At 520, the method 500 can include identifying, at the controller module 28, a first length of the first lateral flight path. In some aspects the controller module 28 can identify at least one bank angle of the first flight path or the second flight path. In additional aspects the controller module 28 can compare at least one bank angle of the first flight path to at least one bank angle of the second flight path.

At 530, the method 500 can include generating, by the controller module 28, a second lateral flight path associated with flying from the first location to the second location wherein the second lateral flight path is along at least a portion of the first straight segment and a portion of the second straight segment and the second lateral flight path has a length less than the length of the first lateral flight path. In some aspects the controller module 28 can include generating the second flight path with at least one bank angle smaller than at least one bank angle of the first flight path. At 540, the method 500 can include generating, by the controller module 28, a set of instructions indicative of the second flight path. At 550, the method 500 can include outputting the set of instructions, by the controller module 28, from a flight management system. At 560, the method 500 can include operating the aircraft by the controller module 28 in accordance with the set of instructions associated with the second lateral flight path.

Figure 6:
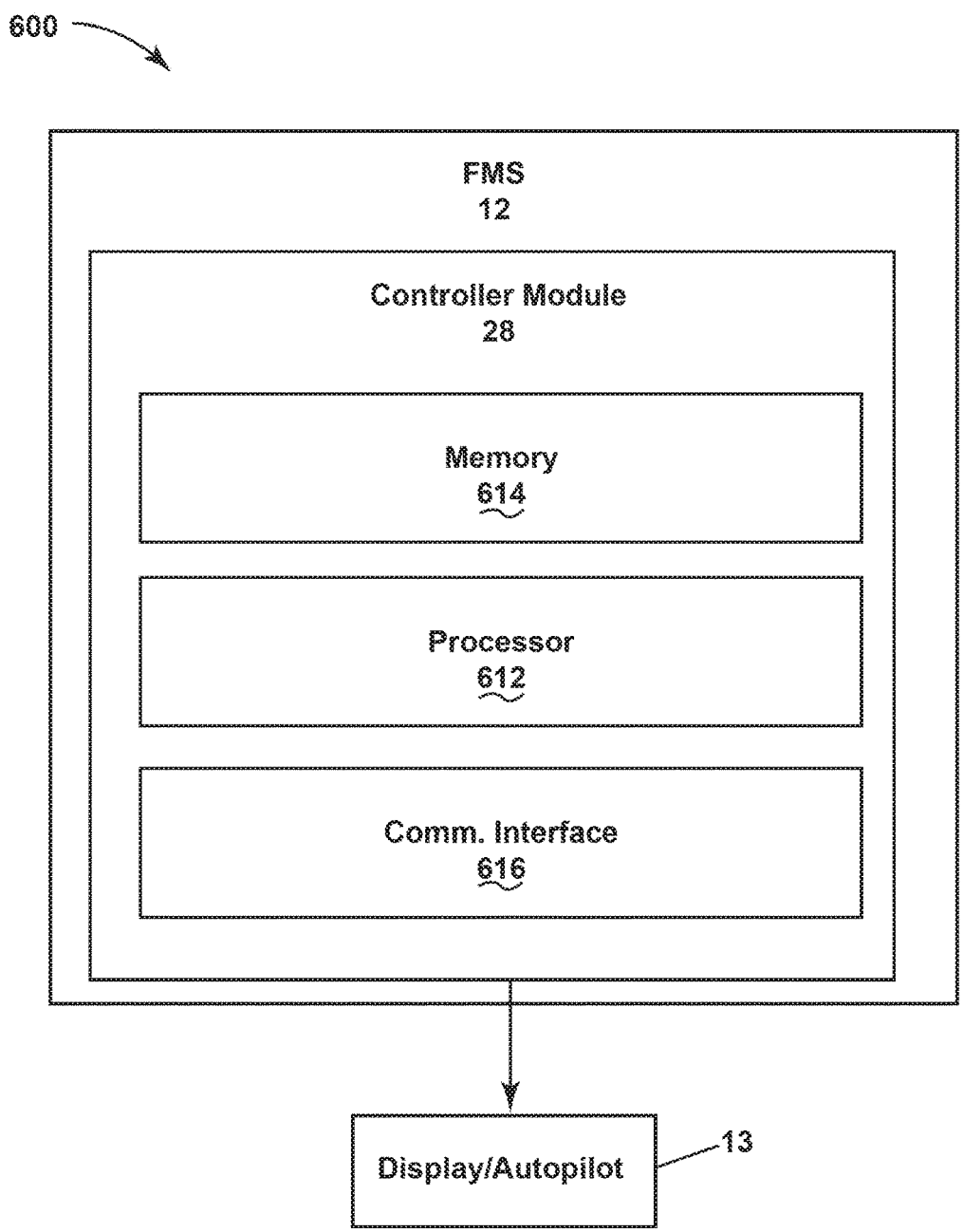
FIG. 6 illustrates an example controller module in accordance with various aspects described herein.

FIG. 6 illustrating a flow chart depicting the flow of information traveling within a control system 600. The control system 600 can include the controller module 28 to the FMS 12 and then to the display 13 or autopilot controller module. In general, the controller module 28 may correspond to any suitable processor-based device, including one or more computing devices. The controller module 28 can include one or more processors(s) 612 and one or more memory devices(s) 614. The one or more processors(s) 612 can include any suitable processing device, such as a microprocessor, micro-control device, integrated circuit, logic device, or the like. The one or more memory devices(s) 614 can include one or more computer-readable media, including, but not limited to, non-transitory computer-readable media, RAM, ROM, hard drives, flash drives, or the like.

The one or more memory device(s) 614 can store information accessible by the one or more processor(s) 612, including computer-readable instructions that can be executed by the one or more processors(s) 612. The instructions can be any set of instructions that when executed by the one or more processors(s) 612, cause the one or more processors(s) 612 to perform operations. In some aspects, the instructions can be executed by the one or more processor(s) 612, to cause the one or more processors(s) 612 to perform operations. In some aspects, the instructions can be executed by the one or more processor(s) 612 to cause the one or more processor(s) to perform operations, such as any of the operations and functions for which the control system 600 is configured. For instance, the operations can be used for performing method 500, as described herein, or any other operations or functions of the one or more control system. The instructions can be software written in any suitable programming language or can be implemented in hardware. Additionally, or alternatively, the instructions can be executed in logically or virtually separate threads on processor(s) 612. The memory device(s) 614 can further store data that can be accessed by the processor(s) 612. For example, the data can include data indicative of power flows, current flows, temperatures, actual voltages, nominal voltages, gating commands, switching patterns, or any other data/or information described herein.

The controller module 28 can also include a communication interface 616. The communication interface 616 can include suitable components for interfacing with one or more network(s), devices, or the like, including for example, transmitters, receivers, ports, control devices, antennas, or other suitable components.

Many other possible configurations in addition to those shown in the above figures are contemplated by the present disclosure. To the extent not already described, the different features and structures of the various aspects can be used in combination with others as desired. That one feature cannot be illustrated in all of the aspects is not meant to be construed that it cannot be, but is done for brevity of description. Thus, the various features of the different aspects can be mixed and matched as desired to form new aspects, whether or not the new aspects are expressly described. Combinations or permutations of features described herein are covered by this disclosure.

Further aspects of the invention are provided by the subject matter of the following clauses:

A method of providing fuel saving through trajectory optimization of an aircraft, comprising, receiving, at a controller module, a first lateral flight path defined by a first straight segment, a curved segment, and a second straight segment associated with flying from a first location to a second location, identifying, at the controller module, a first length of the first lateral flight path, generating, by the controller module, a second lateral flight path associated with flying from the first location to the second location wherein the second lateral flight path is along at least a portion of the first straight segment and a portion of the second straight segment and the second lateral flight path has a length less than the length of the first lateral flight path, generating, by the controller module, a set of instructions indicative of the second flight path, outputting the set of instructions, by the controller module, from a flight management system, and operating the aircraft in accordance with the set of instructions associated with the second lateral flight path.

The method of any of the preceding clauses, wherein the first straight segment and the second straight segment intersect at a transition point.

The method of any of the preceding clauses, wherein a distance between the end of a curved segment and the transition point defines a turn initiation boundary distance.

The method of any of the preceding clauses, wherein the turn initiation boundary distance of the second lateral flight path is greater than the turn initiation boundary distance of the first lateral flight path.

The method of any of the preceding clauses, further comprises identifying at least one bank angle of the first flight path.

The method of any of the preceding clauses, further comprises identifying at least one bank angle of the second flight path.

The method of any of the preceding clauses, further comprises comparing at least one bank angle of the first flight path to at least one bank angle of the second flight path.

The method of any of the preceding clauses, wherein generating the second flight path further comprises generating the second flight path with at least one bank angle smaller than at least one bank angle of the first flight path.

The method of any of the preceding clauses, wherein at least one bank angle of the first flight path and at least one bank angle of the second flight path are located within a boundary area.

A flight management system comprising, a display electrically coupled to the flight management system, and a controller module configured to, compute a first lateral flight path defined by a first straight segment, a curved segment, and a second straight segment associated with flying from a first location to a second location, identify a length of the first lateral flight path, generate a second lateral flight path associated with the first location and the second location wherein the second lateral flight path is along at least a portion of the first straight segment and a portion of the second straight segment and the second lateral flight path has a length less than the length of the first lateral flight path, generate a set of instructions indicative of the second flight path; and output the set of instructions to the display.

The system of any of the preceding clauses, further comprises identifying at least one bank angle of the first flight path.

The system of any of the preceding clauses, further comprises identifying at least one bank angle of the second flight path.

The system of any of the preceding clauses, further comprises comparing at least one bank angle of the first flight path to at least one bank angle of the second flight path.

The system of any of the preceding clauses, wherein generating the second flight path further comprises generating the second flight path with at least one bank angle smaller than at least one bank angle of the first flight path.

The system of any of the preceding clauses, wherein at least one bank angle of the first flight path and at least one bank angle of the second flight path are located within a boundary area.

A method of trajectory optimization of an aircraft, comprises, identifying, by one or more computing devices, a first flight path associated with a first location and a second location, identifying, by one or more computing devices, a first flight path length, generating, by one or more computing devices, a second flight path associated with the first location and the second location, wherein the second flight path has a second flight path length less than the first flight path length, generating a set of instructions, by one or more computing devices, to output the second flight path; and outputting the set of instructions, by one or more computing devices, from a flight management system.

The method of any of the preceding clauses, further comprises identifying at least one bank angle of the first flight path and identifying at least one bank angle of the second flight path.

The method of any of the preceding clauses, further comprises comparing at least one bank angle of the first flight path to at least one bank angle of the second flight path.

The method of any of the preceding clauses, wherein generating the second flight path further comprises generating the second flight path with at least one bank angle smaller than at least one bank angle of the first flight path.

The method of any of the preceding clauses, wherein the at least on bank of the first flight path and the at least one bank angle of the second flight path are located within a boundary area.

This written description uses examples for the disclosure, including the best mode, and also to enable any person skilled in the art to practice the disclosure, including making and using any devices or systems and performing any incorporated methods. The patentable scope of the disclosure is defined by the claims, and can include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method of providing fuel saving through trajectory optimization of an aircraft, comprising:
    receiving, at a controller module, a first lateral flight path defined by a first straight segment, a curved segment, and a second straight segment associated with flying from a first location to a second location;
    identifying, at the controller module, a first length of the first lateral flight path;
    generating, by the controller module, a second lateral flight path associated with flying from the first location to the second location wherein the second lateral flight path is along at least a portion of the first straight segment and a portion of the second straight segment and wherein the second lateral flight path has a length less than the length of the first lateral flight path;
    generating, by the controller module, a set of instructions indicative of the second flight path; and
    outputting the set of instructions operable to operate the aircraft, by the controller module, from a flight management system.

2. The method of claim 1, wherein the first straight segment and the second straight segment intersect at a transition point.

3. The method of claim 2, wherein a distance between the curved segment and the transition point defines a turn initiation boundary distance.

4. The method of claim 3, wherein the turn initiation boundary distance of the second lateral flight path is greater than the turn initiation distance of the first lateral flight path.

5. The method of claim 1, further comprises identifying at least one bank angle of the first flight path.

6. The method of claim 5, further comprises identifying at least one bank angle of the second flight path.

7. The method of claim 6, further comprises comparing at least one bank angle of the first flight path to at least one bank angle of the second flight path.

8. The method of claim 7, wherein generating the second flight path further comprises generating the second flight path with at least one bank angle smaller than at least one bank angle of the first flight path.

9. The method of claim 5, wherein the at least one bank angle of the first flight path and the at least one bank angle of the second flight path are located within a boundary area.

10. A flight management system comprising:
    a display electrically coupled to the flight management system; and
    a controller module configured to:
        compute a first lateral flight path defined by a first straight segment, a curved segment, and a second straight segment associated with flying from a first location to a second location;
        identify a length of the first lateral flight path;
        generate a second lateral flight path associated with the first location and the second location wherein the second lateral flight path is along at least a portion of the first straight segment and a portion of the second straight segment, and wherein the second lateral flight path has a length less than the length of the first lateral flight path;
        generate a set of instructions indicative of the second flight path; and
        output the set of instructions to the display.

11. The system of claim 10, further comprises identifying at least one bank angle of the first flight path.

12. The system of claim 11, further comprises identifying at least one bank angle of the second flight path.

13. The system of claim 12, further comprises comparing at least one bank angle of the first flight path to at least one bank angle of the second flight path.

14. The system of claim 13, wherein generating the second flight path further comprises generating the second flight path with at least one bank angle smaller than at least one bank angle of the first flight path.

15. The system of claim 11, wherein the at least one bank angle of the first flight path and the at least one bank angle of the second flight path are located within a boundary area.

16. A method of trajectory optimization of an aircraft, comprises:
    identifying, by one or more computing devices, a first flight path defined by a first straight segment, a curved segment, and a second straight segment associated with a first location and a second location;
    identifying, by one or more computing devices, a first flight path length;
    generating, by one or more computing devices, a second flight path associated with the first location and the second location, wherein the second flight path is along at least a portion of the first straight segment and a portion of the second straight segment, and wherein the second flight path has a second flight path length less than the first flight path length;
    generating a set of instructions, by one or more computing devices, to output the second flight path; and
    outputting the set of instructions, by one or more computing devices, to a display coupled from a flight management system.

17. The method of claim 16, further comprises identifying at least one bank angle of the first flight path and identifying at least one bank angle of the second flight path.

18. The method of claim 17, further comprises comparing at least one bank angle of the first flight path to at least one bank angle of the second flight path.

19. The method of claim 18, wherein generating the second flight path further comprises generating the second flight path with at least one bank angle smaller than at least one bank angle of the first flight path.

20. The method of claim 17, wherein the at least one bank angle of the first flight path and the at least one bank angle of the second flight path are located within a boundary area.

* * * * *

UNITED STATES PATENT AND TRADEMARK OFFICE
CERTIFICATE OF CORRECTION

| | |
|---|---|
| PATENT NO. | : 11,422,574 B2 |
| APPLICATION NO. | : 16/936525 |
| DATED | : August 23, 2022 |
| INVENTOR(S) | : Christi Lynn Bohmbach et al. |

It is certified that error appears in the above-identified patent and that said Letters Patent is hereby corrected as shown below:

In the Claims

Column 10 Claim 1, Line 60 "(...generating, by the controller module, a second lateral flight path associated with flying from the first location to the second location wherein the second lateral flight path is along at least a portion of the first straight segment and a portion of the second straight segment and wherein the second lateral flight path has a length less than the length of the first lateral flight path;"

Should read --generating, by the controller module, a second lateral flight path associated with flying from the first location to the second location wherein the second lateral flight path is along at least a portion of the first straight segment and a portion of the second straight segment, and wherein the second lateral flight path has a length less than the length of the first lateral flight path;--.

Signed and Sealed this
Twentieth Day of December, 2022

*Katherine Kelly Vidal*

Katherine Kelly Vidal
*Director of the United States Patent and Trademark Office*